United States Patent
Giallorenzi

[11] 3,957,340
[45] May 18, 1976

[54] ELECTROOPTICAL AMPLITUDE MODULATOR

[75] Inventor: Thomas G. Giallorenzi, Springfield, Va.

[73] Assignee: The United States of America as represented by the Secretary of the Navy, Washington, D.C.

[22] Filed: Feb. 25, 1975

[21] Appl. No.: 553,053

[52] U.S. Cl. .......................... 350/96 WG; 350/96 C
[51] Int. Cl.² ......................................... G02B 5/14
[58] Field of Search ...................... 350/96 WG, 96 C

[56] References Cited
UNITED STATES PATENTS

| | | | |
|---|---|---|---|
| 3,465,159 | 9/1969 | Stern | 350/96 WG |
| 3,610,727 | 10/1971 | Ulrich | 350/96 WG |

OTHER PUBLICATIONS

Yajima, "Dielectric Thin Film Optical Branching Waveguide," *Applied Physics Letters*, Vol. 22, No. 12, June 15, 1973, pp. 647–649.

*Primary Examiner*—John K. Corbin
*Assistant Examiner*—Stewart Levy
*Attorney, Agent, or Firm*—R. S. Sciascia; Arthur L. Branning; Melvin L. Crane

[57] ABSTRACT

An optical waveguide system for transforming the output of a phase modulator into an amplitude modulation. Laser light propagating in the waveguide is forwarded into branches in the waveguide. An electrooptic material placed in one or more branches is electrically controlled to vary the phase in each branch causing different propagation modes. The branched optical radiation or coherent light is then recombined in a single branch and subsequently branched again with each subsequent branch propagating a different mode. By tapering one of the latter branches to zero thickness, selective modes can be blocked resulting in amplitude modulation.

3 Claims, 1 Drawing Figure

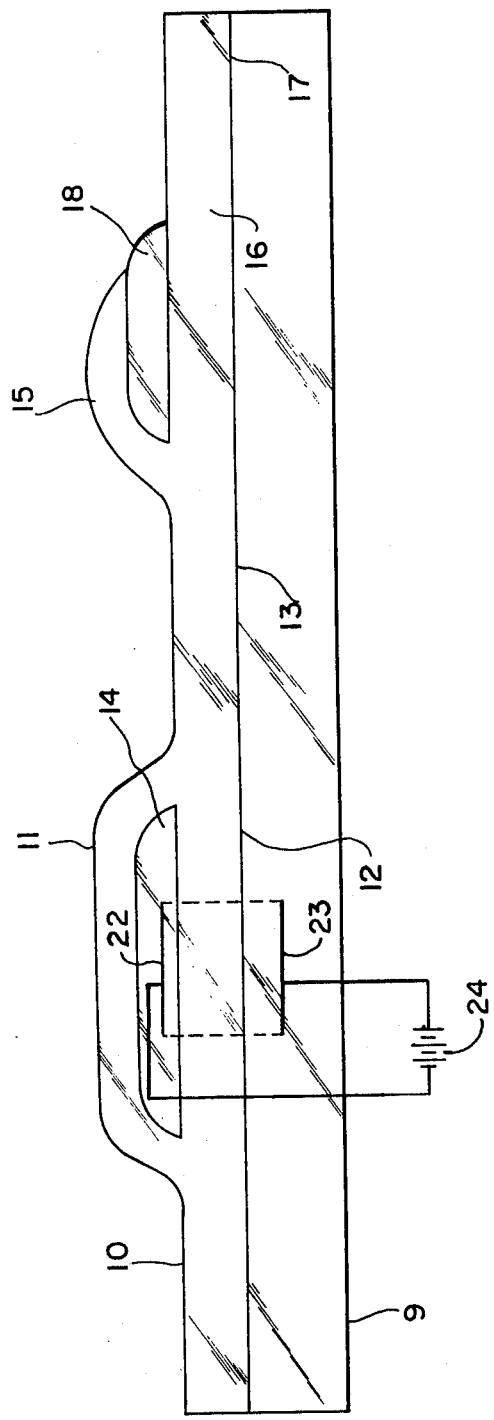

ELECTROOPTICAL AMPLITUDE MODULATOR

BACKGROUND OF THE INVENTION

Heretofore electrooptical phase modulators have been used in which the application of an electrical field causes an induced index of refraction change in the waveguide. This index change is applied in such a manner that one part of the propagating optical beam, i.e., one polarization, suffers a phase retardation relative to the remaining part of the optical beam, i.e., the other polarization. This phase retardation manifests itself in a rotation of the polarization linearly polarized light generally becoming elliptically polarized. The prior art method of producing a modulator with this effect is to place an active crystal between two polarizers. The application of an electric field rotates the incoming polarization and light is either passed or blocked by the analyzer polarizer. Bulk electrical optical modulators based on the above description have been set forth in "Modulators for Optical Communication" by F. C. Chen, in Proc. IEEE, Vol. 58, No. 10, pages 1440–1457, October, 1970.

Electrooptical modulators are believed to play an important role in the emerging integrated optics technology. In addition to the above, the following systems are set forth; "Thin Film $LiNbO_3$ Electro-Optical Light Modulator" by I. P. Kaminaro et al, in Applied Physics Letters, Vol. 22, No. 10, pages 540–542, May 15, 1973; "Waveguide Electro-Optic Modulation in II and VI Compounds" by W. E. Martin, Journal of Applied Physics, 44, page 3703, 1973; and "Dielectric Thin Film Optical Branching Waveguide" by H. Yajima, Applied Physics Letters, Vol. 22, No. 12, pages 647–649, June 15, 1973.

Thin film integrated optical form presents problems that preclude a simple extension of bulk modulator techniques in fabricating a thin film electrooptic amplitude modulator. A major problem is that usually the phase retardation is applied between the TE and TM modes. Unless these modes are degenerate and coupled, it is not possible to mix them within the waveguide. Therefore, in order to mix these modes, one must allow the beam to propagate out of the waveguide. In such systems, one can use external polarizers or heterodyne detectors to study such phase modulation. However, the use of external polarizers or detectors defeats the purpose of integrated optics which combines the light within the system. Therefore it is desired to obtain a method of changing the phase modulation in a waveguide into an amplitude modulation while the beam is still within the optical waveguide.

SUMMARY OF THE INVENTION

This invention is directed to a system in which there is provided a means of transforming the output of a phase modulator into an amplitude modulation in an optical waveguide. The system set forth is based on the principles of branching waveguides such as set forth above by H. Yajima. The waveguide system is made with one or more sections with each section including a branching arm. The branches rejoin the main section except for the latter branch in which the output end section of the branch is tapered to a closed arm with zero thickness so that the waveguiding in the tapered end branch is destroyed. Each branching section is provided with an electrooptical effect in order to shift the modes into different arms after which they are recombined in one arm except for the last section where the mode in one arm is destroyed. The end section with the tapered arm is identified as a mode filter and may be replaced by other mode filters such as a grating mode filter; however, the tapered arm is preferred.

BRIEF DESCRIPTION OF THE DRAWING

The FIGURE illustrates a schematic of the waveguide system.

DETAILED DESCRIPTION

Now referring to the drawing, there is shown a schematic diagram of an optical waveguide made in accordance with the teaching of this invention. As shown the system includes a substrate 9, a waveguide section 10, a branching arm section including arms 11 and 12 in which arm 12 is a continuation of waveguide section 10 and arm 11 connects at each end thereof to arm 12 which is joined at its output end to a single waveguide section 13, and arm 11 is spaced from arm 12 by use of a tapered end glass layer 14. The single waveguide section 13 continues to join with another arm branching section which includes arms 15 and 16. Arm 15 branches off arm 16 and is tapered to zero thickness at one end and does not rejoin arm section 16. Arm section 16 continues in a straight section that forms the output end 17. Branching arm 15 is spaced from arm 16 by a tapered end glass layer 18 of the same type as glass layer 14.

The branching waveguide is formed as follows: a waveguide layer of glass having an index of refraction of $n_1$ such as from 1.5 to 2.4 with a thickness of ~1mm is sputtered or otherwise applied onto substrate 9 which has an index of refraction of $n_2$ ($n_2 < n_1$). The spaced glass layers 14 and 18 having an index of refraction of $n_3$ ($n_3 \approx n_2 < n_1$) and are sputtered or otherwise applied onto the waveguide layer in spaced relationship as shown on the drawing. After the glass layers 14 and 18 have been applied onto the waveguide layer, the branching arms 11 and 15 are sputtered onto or otherwise applied onto the glass layers with each end of branching arm 11 connecting with the waveguide layer and the branching arm 15 connected at one end to the waveguide layer with the other end being tapered to zero. The branching arms 11 and 15 have an index of refraction of $n_4$ ($n_4 \approx n_1$) with branching arm 11 having a thickness of ~1mm and the input end of branching arm 15 having a thickness of ~1mm tapering to a zero thickness at the other end. The waveguide layers and branching arms may be sputtered onto the substrate and glass layers in between the arms, as set forth by H. Yajima.

The section containing branching arm 11 and section arm 12 is constructed such that arms 11 and 12 have waveguide mode characteristics which are degenerate, i.e., light propagating in arm 11 or 12 have the same $B/k$ where $B$ is the effective waveguide propagation constant. Further, arms 11 and/or 12 are made with an electrooptic region 21, as shown in arm 12. Optically transparent electrodes 22, 23 are applied to opposite sides of the electrooptical region and an alternating current from a source 24 is applied thereto if desired in order to change the index of refraction of the waveguide section in the electrooptical region. An electrooptical region is one which is formed of an optically transparent material in which the normal index of refraction changes in accordance with an applied voltage.

In operation, coherent light of mode M=0 is coupled into waveguide section 10. The light will couple equally into arms 11 and 12; therefore, in each arm, mode M=0 will be coupled. If no voltage is applied across the electrooptical region 21, the light in arms 11 and 12 will recombine in section 13 as mode M=0. If a voltage sufficient to produce a 180° phase shift is applied to the electrooptical region in arm 12, the phase of the mode in arm 12 is shifted relative to the phase in arm 11. Then the light passing through arms 11 and 12 will recombine in section 13 with a mode M = 1. Thus, the output mode in arm 13 is determined by the voltage applied to the electrooptical region. If the phase change is less than 180°, then two modes will be obtained in the output of section 13. Both arms 11 and 12 could have an electrooptical region to which an electrical voltage could be applied to produce the phase shift. The voltage to be applied to the electrooptic material region is arbitrarily chosen to provide any desired depth of amplitude modulation.

The recombined light in section 13 is directed to the junction of arms 15 and 16. Light propagation at this junction has the propagation characteristics described by H. Yajima wherein all odd modes go into one arm of the junction and all even modes go into the other arm. Arm 15 is made with a tapered end of zero thickness, therefore whichever mode, even or odd, enters arm 15 will be destroyed. Since the waveguiding in arm 15 is destroyed, the mode entering output section 17 will be the even or odd mode not destroyed. Assuming the odd modes enter arm 15 and are destroyed, the even modes will enter arm 16 and pass on to output end section 17. Thus the output in section 17 is determined by the voltage applied in the electrooptical region 21 in arm 12, as shown, or in arm 11 and/or arms 11 or 12, not shown. As such, in the operation described, amplitude modulation is achieved with an electrooptical phase modulator in an optical waveguide, as described.

It has been determined that the above described system is a unique means for converting an electrooptical waveguide phase modulator into an electrooptical waveguide amplitude modulator without the need of using external polarizers or heterodyne detectors to measure the phase modulation. Further the system allows for a fully integrated electrooptical amplitude modulator as well as a new means of electrical mode conversion.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. An electrooptical waveguide amplitude modulator, which comprises:
   an optical waveguide;
   said optical waveguide including an input section;
   a first branching two arm section with one arm continuously joining said input section;
   said first branching two arm section joined together at their output ends in a single continuous waveguide output section;
   said single output waveguide section formed into a second branching two arm section;
   one arm of said second branching arm section tapering into a zero thickness and the other branch continuing to a waveguide output end section joined therewith;
   at least one arm of said first branching arm section having an electrooptical material region;
   optically transparent electrodes on opposite sides of said electrooptical material region; and
   an electrical voltage means electrically connected with said electrodes for applying a voltage across said electrooptical material region upon demand.

2. An electrooptic waveguide amplitude modulator, as claimed in claim 1; in which
   the voltage to be applied to the electrooptic material region is sufficient to change the phase of the input light 180°.

3. An electrooptic waveguide amplitude modulator as claimed in claim 1; in which
   said inlet section, said outlet section and said arm sections continuous therewith have the same thickness.

* * * * *